(12) United States Patent
Hicks et al.

(10) Patent No.: US 8,251,081 B2
(45) Date of Patent: Aug. 28, 2012

(54) DEVICE FOR METERING FLUIDS

(75) Inventors: Dale Hicks, Addlestone (GB); John H. Matthews, Cumming, GA (US)

(73) Assignee: Enraf B.V, Delft (NL)

( * ) Notice: Subject to any disclaimer, the term of this patent is extended or adjusted under 35 U.S.C. 154(b) by 421 days.

(21) Appl. No.: 12/527,856

(22) PCT Filed: Feb. 19, 2007

(86) PCT No.: PCT/US2007/062380
§ 371 (c)(1),
(2), (4) Date: Aug. 19, 2009

(87) PCT Pub. No.: WO2008/103167
PCT Pub. Date: Aug. 28, 2008

(65) Prior Publication Data
US 2010/0018583 A1    Jan. 28, 2010

(51) Int. Cl.
| G01F 25/00 | (2006.01) |
| F17D 1/00 | (2006.01) |
| E03B 7/07 | (2006.01) |

(52) U.S. Cl. ......... 137/1; 137/613; 137/614.2; 137/544; 73/1.16; 73/1.36

(58) Field of Classification Search ............... 137/614.2, 137/613, 544, 1; 73/1.16, 1.36
See application file for complete search history.

(56) References Cited

U.S. PATENT DOCUMENTS

| 4,174,733 | A | 11/1979 | Eidsmore et al. |
| 5,542,450 | A * | 8/1996 | King et al. ................. 137/614.2 |
| 7,274,447 | B2 * | 9/2007 | Schroeder .................... 356/338 |
| 7,357,023 | B2 * | 4/2008 | Parris et al. .................... 73/197 |
| 2003/0080145 | A1 | 5/2003 | Struthers et al. |

FOREIGN PATENT DOCUMENTS

| EP | 0 191 576 A2 | 8/1986 |
| EP | 0 298 587 A2 | 1/1989 |
| EP | 0 305 134 A1 | 3/1989 |
| EP | 0 686 833 A1 | 12/1995 |

OTHER PUBLICATIONS

International Search Report dated Nov. 6, 2007 in connection with PCT Application No. PCT/US2007/062380.

* cited by examiner

*Primary Examiner* — Kevin Lee

(57) ABSTRACT

A device for metering fluids includes a block provided with a channel connecting a fluid inlet in fluid communication with a fluid outlet. The device also includes a filter assembly within the channel and a fluid meter within the channel at a position downstream from the filter assembly. The device further includes a check valve assembly within the channel at a position downstream from the fluid meter. In addition, the device includes a calibration valve assembly within a channel section of the channel between the fluid outlet and the fluid meter. The calibration valve assembly is operable to move between a first position allowing passage of fluid from the fluid meter towards the fluid outlet and a second position blocking the passage of fluid from the fluid meter towards the fluid outlet.

20 Claims, 4 Drawing Sheets

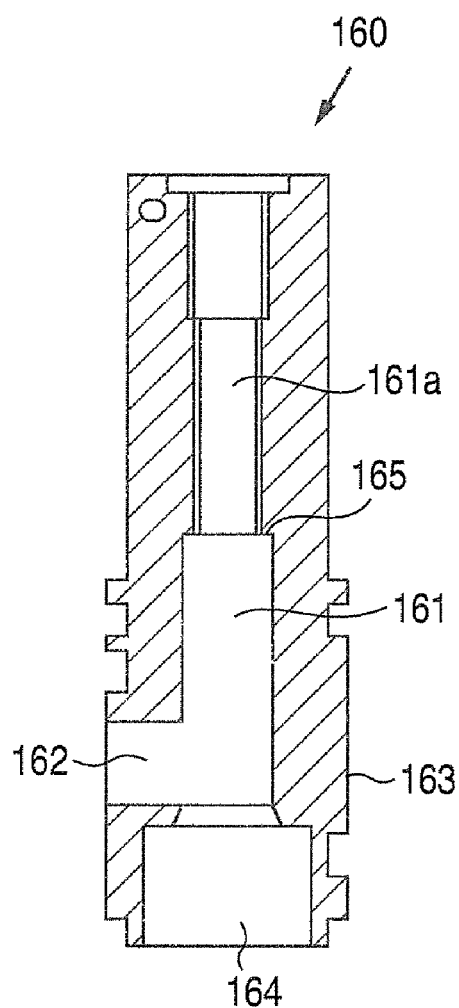
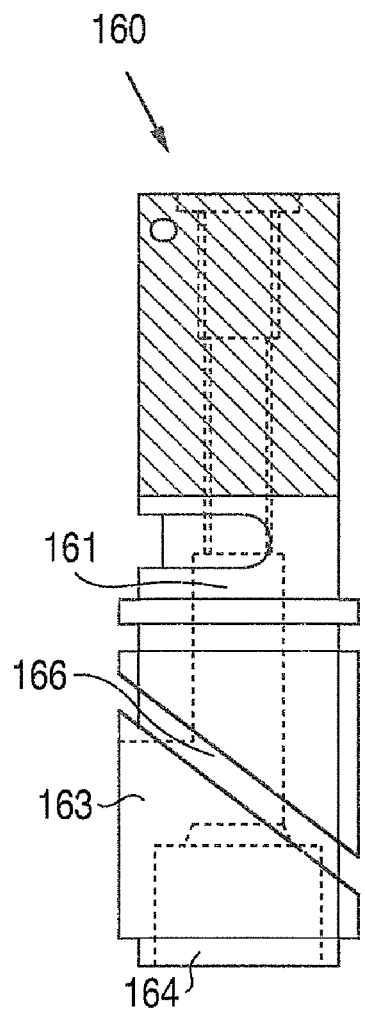
FIG. 4A
FIG. 4B

DEVICE FOR METERING FLUIDS

CROSS-REFERENCE TO RELATED APPLICATIONS

The present application claims priority to International Patent Application No. PCT/US2007/062380 filed on Feb. 19, 2007 and entitled "DEVICE FOR METERING FLUIDS," which is hereby incorporated by reference.

FIELD OF THE INVENTION

The invention relates to a device for metering fluids comprising a solid block provided within said block with a fluid inlet being in fluid communication with a fluid outlet via a channel; a filter assembly being accommodated within said channel; a fluid meter being accommodated within said channel at a position downstream from the filter assembly; a check valve assembly being accommodated within said channel at a position downstream from the fluid meter.

BACKGROUND OF THE INVENTION

A metering device according to the above preamble is, for example, disclosed in U.S. Pat. No. 5,542,450. With this device, fluids and especially fuels can be metered accurately. Use is made of a solid block which serves as a manifold and which includes an internal filter assembly, an internal check valve, channels within the block serving as fluid conduits, and inlet and outlet ports which provide a means for connecting the block to the source of the fluid to be measured.

Although the metering device according to this U.S. patent may be provided with additional channels present in the block for the use of accessories such as pressure detectors, pressure release valves, etc., the known metering device is still a passive component as it only is capable of measuring the fluid passing through the channels in the block.

It is therefore an object of the invention to provide a metering device as described above with an additional functionality, which will improve the accuracy of the metering device during use.

According to the invention, the metering device is characterized in that a calibration valve assembly is accommodated within a channel section of said channel between the fluid outlet and the fluid meter, said calibration valve assembly being operable between a first, 'normal' position allowing the passage of fluid from the fluid meter towards the fluid outlet and a second, 'calibration' position blocking the passage of fluid from the fluid meter towards the fluid outlet.

With this calibration functionality it is possible to set the device in a so called calibration cycle improving the accuracy and functionality of the device.

In a further embodiment in the second, 'calibration' position said calibration valve assembly is in fluid connection with a calibration channel present within said block. This allows an accurate calibration of the metering device wherein no fluid is spilled or leaking out of the channels present in the block allowing a highly accurate calibration step also with the use of very small fluid quantities.

In a specific embodiment, the calibration valve assembly comprises a valve spindle to be rotatably mounted within said channel, said valve spindle having a bore, which bore can be brought in fluid communication with said channel and said fluid outlet or said calibration channel upon rotating said valve spindle between said first and second positions and vice versa. With these technical features, it is possible to set the metering device in an accurate and an unambiguous way from its normal operation position towards its calibration position Furthermore, the outer dimensions of said valve spindle conform to the inner dimensions of said channel section.

Moreover, as the valve spindle has outer dimensions which conform to the inner dimensions of the channel section within the block, no leakage will occur and no fluid to be metered will leak away towards the normal outlet but will be maintained within the calibration channel, allowing for an accurate calibration step.

In order to set the flow rate of the fluid through the metering device accurately a valve stem is mounted within the bore of said valve spindle and arranged in setting the flow rate through the bore.

Especially the valve stem is provided with an outer screw thread engaging an inner screw thread provided in the inner circumferential surface of the bore, so to allow an accurate setting of the valve stem within the valve spindle and hence an accurate flow rate setting.

BRIEF DESCRIPTION OF THE DRAWINGS

The invention shall now be described by means of the following drawings, which drawings show in:

FIGS. 4a-4b a part of the diverter valve assembly according to the invention.

DETAILED DESCRIPTION OF THE PREFERRED EMBODIMENTS

Figure 1:
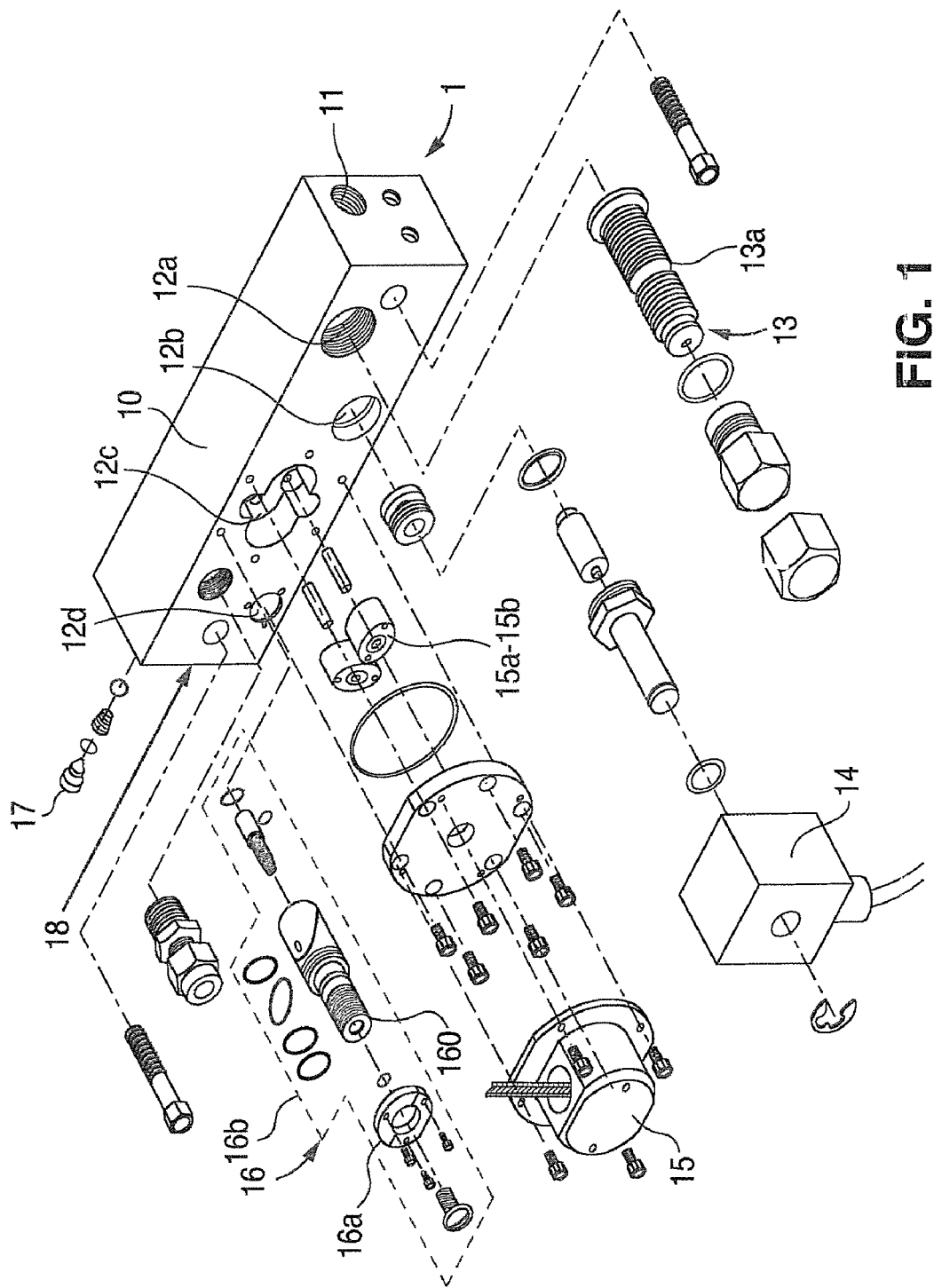
FIG. 1 an exploded view of an embodiment of a device according to the invention.

For the sake of clarity in the following figurative description like parts will be denoted with identical reference numerals.

Reference numeral 1 denotes a device for metering fluids according to an embodiment of the invention. The metering device 1 consists of a solid block 10 through which multiple bores 12a-12d are provided by means of machining, which bores form part of a fluid channel (denoted channel 12 in FIG. 2) within the solid block 10. The channel serves as a passage way for a fluid to be metered, which fluid will enter the solid block 10 via an inlet 11, which fluid will leave the solid block 10 via an outlet 18 present on the left side face of block 10 (in FIG. 1 not visible, but depicted in FIG. 2) after passing through the channel 12 and some additional component parts which are placed in the several bores 12a-12d of the solid block 10.

Figure 2:
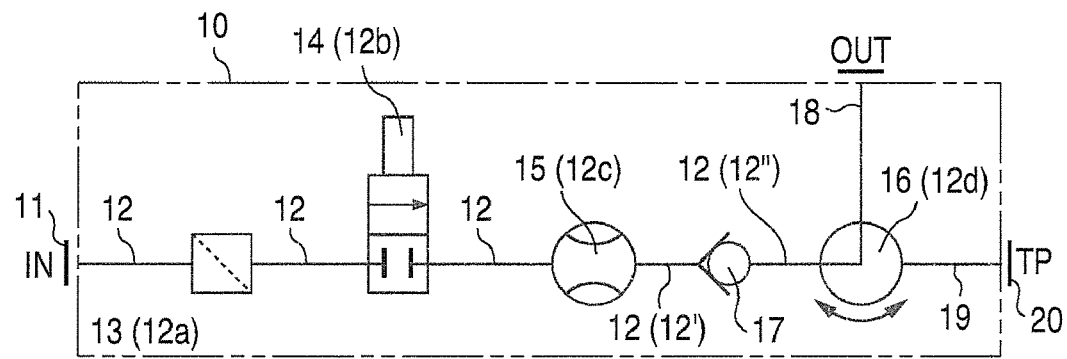
FIG. 2 a schematic view of FIG. 1.

As FIG. 2 clearly shows in combination with FIG. 1, the fluid to be metered entering the inlet port 11 will pass directly a filter assembly 13 consisting of a filter element 13a which is to be placed within the bore 12a. The filter element 13a will filter the fluid entering the solid block 10 via the inlet port 11 and remove any impurities from the fluid, preventing the vital parts of the other component parts from damage.

In the fluid channel 12 an on/off solenoid valve is present directly downstream to the filter assembly 13, which solenoid valve 14 serves to set or shut down the metering device and to control the pulse rate of the fluid flow through the block 10.

Reference numeral 15 denotes a fluid meter comprising two rotating elements 15a-15b which are present in the flow stream of the fluid passing through the channel 12 which elements 15*a*-15*b* are arranged in generating a signal corresponding to the flow rate of the fluid passing through the block 10.

Reference numeral 17 discloses a one way check valve preventing the inflow of fluid in reverse direction through the block 10, thereby avoiding an inaccurate or incorrect determination of the flow rate by the fluid meter 15.

According to the invention the device 1 is provided with a calibration valve assembly 16 which is positioned downstream from the fluid meter and the one way check valve 17 and which is furthermore connected with the outlet opening 18. The calibration valve assembly can be operated between a first, normal position and a second, calibration position.

Figure 3:
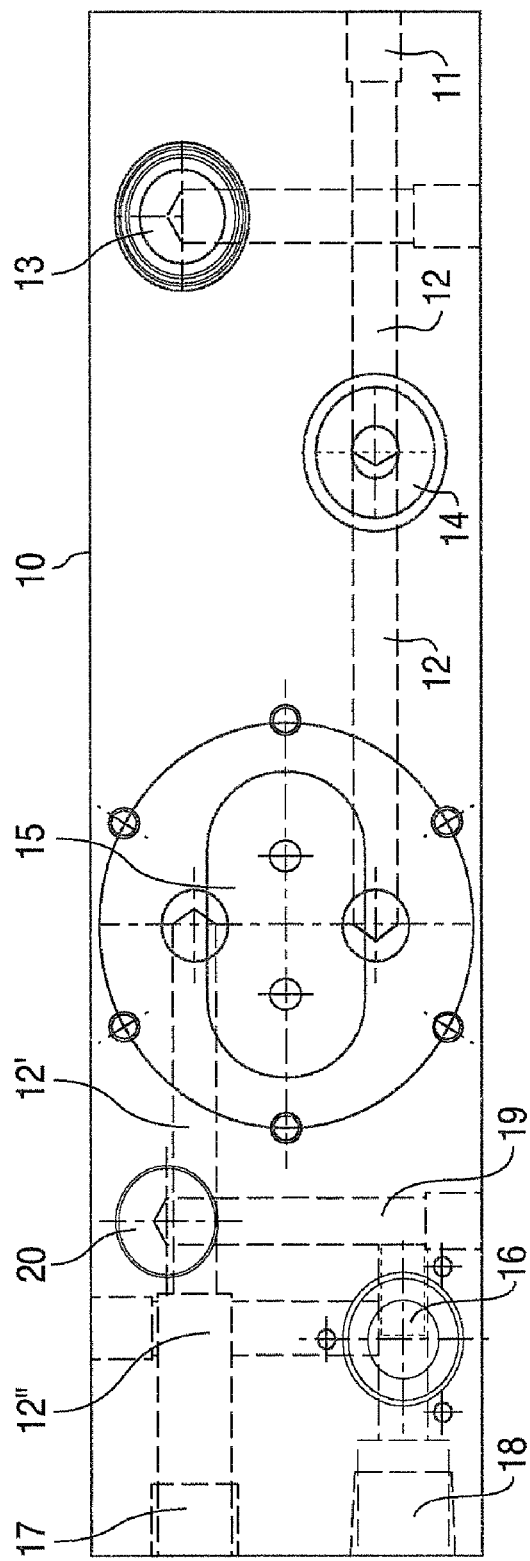
FIG. 3 a detailed view of the embodiment shown in FIG. 2.

When looking at FIG. 3 it is to be noted that in this Figure the flow path of the fluid to be metered and especially the bores 12*a*-12*d* and channel 12 machined in the block 10 are to be seen in a 3D view. That is that the channel section 12' directly downstream of the fluid meter 15 connects to the channel section 12" (in which channel section the one way check valve 17 is accommodated). In channel section 12" the calibration valve assembly 16 according to the invention is mounted, capable of diverting the fluid flow towards the outlet port 18 (first, 'normal' position) or towards the calibration channel section 19 and the calibration outlet port 20 (second, 'calibration' position). Hence the calibration outlet port 20 is present in the front face of block 10, whereas channel section 12' is passing behind. Calibration outlet port 20 is therefor not directly in fluid communication with channel section 12'.

As stated above, the calibration valve assembly 16 can be brought into a first position wherein fluid passing through the channel 12 (channel sections 12'-12") is directed towards the outlet port or opening 18. In the second calibration position, the outlet opening 18 is blocked and all fluid is passed from the channel 12 (channel sections 12'-12") towards a calibration channel 19 and towards a calibration outlet port 20 where it can be collected for calibrating purposes. The calibration valve assembly 16 is constructed in such manner that during the calibration, fluid to be calibrated can not leak down through the valve assembly 16 towards the outlet opening 18 and into the process line. This is very important as the metering device according to the present invention is arranged in injecting fluid via the outlet opening 18 in very small quantities requiring a certain level of accuracy to the fluid meter 15.

Calibrating the metering device can be performed with various methods known in the art, e.g. by using a graduated volumetric calibration (glass) vessel connected to the calibration outlet port 20.

However, in order to calibrate the metering device 1 accurately in a likewise manner, also the calibration process has to be carried out at a high accuracy level, therefore any leakage from the calibration valve assembly towards the outlet opening 18 is undesirable.

Any fluid bypassing the calibration valve assembly towards the outlet opening 18, whilst the calibration valve assembly is set in its second, calibration position, will lead to an inaccurate calibration of the device 1. It will be clear that an incorrect calibration of the metering device 1 will result in an incorrect treatment or dispensing of the fluid, for example a fuel.

In the normal position of the calibration valve assembly 16 the fluid, for example a fuel additive, is directed via the channel 12 towards the outlet opening 18 directly to the point where the fluid (fuel additive) is to be injected in the main fuel line.

In FIGS. 4*a* and 4*b* an embodiment is disclosed of a part of the calibration valve assembly. The part depicted in the FIGS. 4*a* and 4*b* is indicated with reference numeral 160 and can be described as a valve spindle which has to be positioned within the bore 12*d*, which bore 12*d* is machined in the solid block 10 and which bore forms a channel section of the channel 12 through which the fluid to be metered is passed.

The valve spindle 160 is rotatably accommodated within said bore and can hence be brought, automatically or by hand, in its first, normal position and its second, calibration position as indicated above. In order to allow the passage of fluid to be metered from the channel 12 through the channel section 12*c* towards the outlet opening 18 or the calibration channel section 19 and the channel outlet 20 the valve spindle 160 is provided with a through bore 161, which ends in an opening 162 present in the circumferential surface 163 of the valve spindle 160.

The fluid flows from channel section 12" (FIG. 3) towards the calibration valve assembly 16, enters the valve spindle 160 via bore section 164, and leaves via opening 162.

In order to avoid leakages multiple sealing rings 16*b* are provided around the valve spindle 160 (see FIG. 1).

As clearly depicted in FIG. 4*b* reference numeral 166 is a slit and more in particular as a slit which is oblique relative to the longitudinal direction of the valve spindle 160. The slit 166 serves to accommodate a sealing ring (not shown in FIG. 4*b* but depicted with common reference numeral 16*b* in FIG. 1) in order to avoid leakage out of the calibration channel 19 (and the calibration valve assembly 16) towards the outlet opening 18 and the (not shown) process line.

Figure 5:
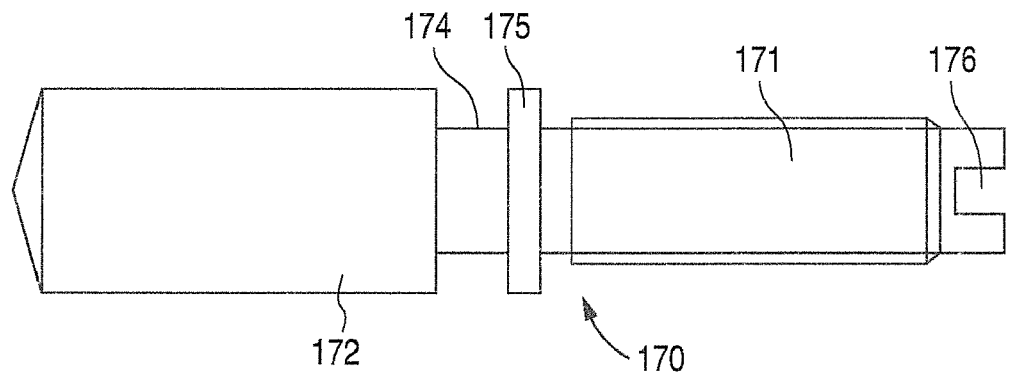
FIG. 5 a further part of the diverter valve assembly according to the invention.

In order to control the flow rate through the device, a valve stem 170 as shown in FIG. 5 is to be mounted within the bore 161. Valve stem 170 is provided with a valve element 171 having a smaller diameter and a valve element 172 having a larger diameter. The valve stem 170 is to be inserted into the bore 161 via bore section 164. The valve element 171 is provided with an outer screw thread cooperating with an inner screw thread provided on the inner surface of the bore section 161*a* in such manner that the valve element 171 is accommodated in the bore section 161*a*.

The flow rate through the valve spindle 160 can be set by rotating the valve stem 170 using a screw driver engaging the slot 176.

The valve stem 170 is provided with a circular notch 175 which rests against the shoulder 165 of the valve spindle 160. This provides a tight closure preventing leakage through the bore 160 which could adversely affect the calibration accuracy of the metering device 1. The valve element 172 has outer dimensions conformal to the inner dimensions of the bore 161, whereas the outer dimensions of the valve element 171 conform to the inner dimensions of the bore section 161*a*. Also with these features no leakage will occur, maintaining the calibration at the high accuracy.

The valve stem 170 is also provided with an indent 174 allowing the fitting of a fluid seal (O-ring), which prevents leakage of fluid through the thread to atmosphere.

The complete calibration valve assembly 16 is mounted in bore 12*d* in block 10 (see FIG. 1) and can be secured within said bore 12*d* using a mounting plate 16*a*, which can be screwed to the block 10.

The invention claimed is:

1. A device comprising:
    a block having a channel connecting a fluid inlet in fluid communication with a fluid outlet;
    a filter assembly within the channel;
    a fluid meter within the channel at a position downstream from the filter assembly;
    a check valve assembly within the channel at a position downstream from the fluid meter; and a calibration valve assembly within a channel section of the channel between the fluid outlet and the fluid meter, the calibration valve assembly operable to move between a first position allowing passage of fluid from the fluid meter towards the fluid outlet and a second position blocking the passage of fluid from the fluid meter towards the fluid outlet;

wherein the calibration valve assembly, when in the second position, is in fluid connection with a calibration channel present within the block.

2. The device according to claim 1, wherein the calibration valve assembly comprises a valve spindle rotatably mounted within the channel, the valve spindle having a bore operable to be brought in fluid communication with (i) the fluid outlet or (ii) the calibration channel upon rotating the valve spindle between the first and second positions.

3. The device according to claim 2, wherein outer dimensions of the valve spindle conform to inner dimensions of the channel section.

4. The device according to claim 2, wherein a valve stem is mounted within the bore of the valve spindle and operable to set a flow rate through the bore.

5. The device according to claim 4, wherein the valve stem has an outer screw thread operable to engage an inner screw thread on an inner circumferential surface of the bore.

6. The device according to claim 1, wherein the calibration valve assembly is positioned between the check valve assembly and the fluid outlet.

7. The device according to claim 1, wherein the block comprises a manifold.

8. The device of claim 1, further comprising:
an on/off solenoid valve within the channel downstream from the filter assembly;
wherein the fluid meter is downstream from the on/off solenoid valve.

9. An apparatus comprising:
a channel connecting a fluid inlet in fluid communication with a fluid outlet;
a fluid meter operable to meter a fluid flowing through the channel; and
a calibration valve operable to move between a first position allowing passage of the fluid from the fluid meter towards the fluid outlet and a second position blocking the passage of the fluid from the fluid meter towards the fluid outlet;
wherein the calibration valve, when in the second position, is in fluid connection with a calibration channel.

10. The apparatus of claim 9, further comprising:
a filter located between the fluid inlet and the fluid meter; and
a check valve located between the fluid meter and the fluid outlet.

11. The apparatus of claim 9, wherein the calibration valve comprises a valve spindle rotatably mounted within the channel, the valve spindle comprising a bore operable to be brought into fluid communication with (i) the fluid outlet or (ii) the calibration channel depending upon whether the calibration valve is in the first or second position.

12. The apparatus of claim 11, wherein outer dimensions of the valve spindle conform to inner dimensions of a channel section where the valve spindle is rotatably mounted within the channel.

13. The apparatus of claim 11, wherein a valve stem is mounted within the bore of the valve spindle and is operable to set a flow rate through the bore.

14. The apparatus of claim 13, wherein the valve stem comprises an outer screw thread operable to engage an inner screw thread on an inner circumferential surface of the bore.

15. The apparatus of claim 9, further comprising:
an on/off solenoid valve configured to control flow of the fluid through the channel to the fluid meter.

16. A method comprising:
receiving a fluid at a fluid inlet of a fluid meter assembly, the fluid meter assembly comprising a channel through which the fluid flows;
metering the fluid flowing through the channel using a fluid meter;
moving a calibration valve within the channel to a first or second position;
when the calibration valve is in the first position, allowing passage of the fluid from the fluid meter towards a fluid outlet of the fluid meter assembly; and
when the calibration valve is in the second position, blocking the passage of the fluid from the fluid meter towards the fluid outlet and allowing passage of the fluid from the fluid meter towards at least one of: a calibration channel and a calibration outlet of the fluid meter assembly.

17. The method of claim 16, wherein moving the calibration valve comprises rotating a valve spindle mounted within the channel, the valve spindle comprising a bore operable to be brought into fluid communication with (i) the fluid outlet or (ii) the calibration channel or the calibration outlet depending upon whether the calibration valve is in the first or second position.

18. The method of claim 17, further comprising:
controlling a flow rate of the fluid through the bore using a valve stem that is mounted within the bore, the valve stem comprising an outer screw thread that engages an inner screw thread on an inner circumferential surface of the bore.

19. The method of claim 16, further comprising:
filtering the fluid prior to metering the fluid; and
passing the fluid through a check valve within the channel after metering the fluid.

20. The method of claim 16, further comprising:
controlling flow of the fluid through the channel to the fluid meter using an on/off solenoid valve.

* * * * *